US012132504B2

(12) United States Patent
Nagamori

(10) Patent No.: US 12,132,504 B2
(45) Date of Patent: Oct. 29, 2024

(54) MULTIPLEXER, RADIO-FREQUENCY MODULE, AND COMMUNICATION APPARATUS

(71) Applicant: Murata Manufacturing Co., Ltd., Kyoto (JP)

(72) Inventor: Hiroyuki Nagamori, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 207 days.

(21) Appl. No.: 17/411,240

(22) Filed: Aug. 25, 2021

(65) Prior Publication Data
US 2021/0384925 A1 Dec. 9, 2021

Related U.S. Application Data

(63) Continuation of application No. PCT/JP2020/004157, filed on Feb. 4, 2020.

(30) Foreign Application Priority Data

Mar. 13, 2019 (JP) ................. 2019-046418

(51) Int. Cl.
*H04L 12/00* (2006.01)
*H04B 1/00* (2006.01)
(Continued)

(52) U.S. Cl.
CPC ............. *H04B 1/0057* (2013.01); *H04B 1/38* (2013.01); *H04L 5/14* (2013.01)

(58) Field of Classification Search
None
See application file for complete search history.

(56) References Cited

U.S. PATENT DOCUMENTS

2016/0380652 A1 12/2016 Anthony et al.
2018/0041190 A1* 2/2018 Yoshimura ........... H03H 1/0007
(Continued)

FOREIGN PATENT DOCUMENTS

CN 108028635 A 5/2018
EP 1215817 A2 * 6/2002 ........... H03H 9/6436
(Continued)

OTHER PUBLICATIONS

International Search Report for International Patent Application No. PCT/JP2020/004157 dated Mar. 10, 2020.
(Continued)

*Primary Examiner* — Noel R Beharry
*Assistant Examiner* — Lionel Preval
(74) *Attorney, Agent, or Firm* — Pearne & Gordon LLP

(57) ABSTRACT

Attenuation on a receive path side in a pass band of a second filter is improved in a case where a first filter, which passes a receive signal, is an acoustic wave filter. A multiplexer includes a common terminal, a first terminal, a second terminal, a first filter, and a second filter. The first filter is an acoustic wave filter disposed on a receive path connecting the common terminal and the first terminal and passes a receive signal. The second filter is disposed on a transmit path connecting the common terminal and the second terminal and passes a transmit signal. The multiplexer further includes an LC filter. The LC filter is disposed on the receive path connecting the common terminal and the first terminal.

14 Claims, 10 Drawing Sheets

(51) Int. Cl.
*H04B 1/38* (2015.01)
*H04L 5/14* (2006.01)

(56) References Cited

U.S. PATENT DOCUMENTS

| | | |
|---|---|---|
| 2018/0152172 A1* | 5/2018 | Takeuchi ............. H04B 1/0057 |
| 2018/0152945 A1* | 5/2018 | Balteanu ................ H04L 5/001 |
| 2018/0198433 A1 | 7/2018 | Mori |
| 2019/0028085 A1 | 1/2019 | Kato et al. |
| 2019/0181907 A1* | 6/2019 | Pfann ................... H04B 1/0057 |
| 2019/0222236 A1 | 7/2019 | Miyazaki et al. |
| 2019/0245519 A1 | 8/2019 | Takamine et al. |
| 2020/0028479 A1 | 1/2020 | Ta et al. |

FOREIGN PATENT DOCUMENTS

| | | |
|---|---|---|
| JP | 2017-017691 A | 1/2017 |
| JP | 2019-024155 A | 2/2019 |
| JP | 2020-014206 A | 1/2020 |
| KR | 10-2018-0121075 A | 11/2018 |
| WO | 2017/043155 A1 | 3/2017 |
| WO | 2018/062321 A1 | 4/2018 |
| WO | 2018/092511 A1 | 5/2018 |

OTHER PUBLICATIONS

Written Opinion for International Patent Application No. PCT/JP2020/004157 dated Mar. 10, 2020.
Ericsson, 3GPP Spectrum Bands, Jul. 31, 2019.

* cited by examiner

MULTIPLEXER, RADIO-FREQUENCY MODULE, AND COMMUNICATION APPARATUS

CROSS REFERENCE TO RELATED APPLICATIONS

This is a continuation of International Application No. PCT/JP2020/004157 filed on Feb. 4, 2020 which claims priority from Japanese Patent Application No. 2019-046418 filed on Mar. 13, 2019. The contents of these applications are incorporated herein by reference in their entireties.

BACKGROUND

Technical Field

The present disclosure generally relates to multiplexers, radio-frequency modules, and communication apparatuses, and more particularly, to a multiplexer including an acoustic wave filter, a radio-frequency module including the multiplexer, and a communication apparatus including the radio-frequency module.

Electronic systems using carrier aggregation are known in the related art (for example, refer to Patent Document 1).

FIG. 2B in Patent Document 1 depicts an electronic system including two antenna switches, a duplexer connected to one of the two antenna switches, and a duplexer connected to the other of the two antenna switches.

Patent Document 1: Japanese Unexamined Patent Application Publication No. 2017-17691

BRIEF SUMMARY

A multiplexer and a radio-frequency module including the multiplexer are sometimes required to operate in a carrier aggregation mode based on, for example, a combination of a first filter (a receive filter or a filter capable of time division duplexing (TDD)) that passes a receive signal in a first pass band and a second filter that passes a transmit signal in a second pass band that differs from the first pass band. The use of an acoustic wave filter as the first filter is sometimes required. However, it is difficult to increase attenuation of an acoustic wave filter in a frequency range (such as a communication band, Band 1 or Band 3) separated from a pass band (such as a communication band, Band 41) of the acoustic wave filter.

The present disclosure provides a multiplexer, a radio-frequency module, and a communication apparatus that can improve attenuation on a receive path side in a pass band of a second filter in a case where a first filter that passes a receive signal is an acoustic wave filter.

A multiplexer according to an aspect of the present disclosure includes a common terminal, a first terminal, a second terminal, a first filter, and a second filter. The first filter is an acoustic wave filter disposed on a receive path connecting the common terminal and the first terminal and passes a receive signal. The second filter is disposed on a transmit path connecting the common terminal and the second terminal and passes a transmit signal. The multiplexer further includes an LC filter. The LC filter is disposed on the receive path connecting the common terminal and the first terminal.

A radio-frequency module according to an aspect of the present disclosure includes the multiplexer, a low-noise amplifier, and a power amplifier. The low-noise amplifier can be connected to the first terminal. The power amplifier can be connected to the second terminal.

A communication apparatus according to an aspect of the present disclosure includes the radio-frequency module and a signal processing circuit. The signal processing circuit processes the transmit signal and the receive signal.

Advantageous Effects of Disclosure

The multiplexer, the radio-frequency module, and the communication apparatus according to the above aspects of the present disclosure can improve attenuation on a receive path side in a pass band of the second filter in a case where the first filter, which passes a receive signal, is an acoustic wave filter.

DETAILED DESCRIPTION

First Embodiment

Figure 1:
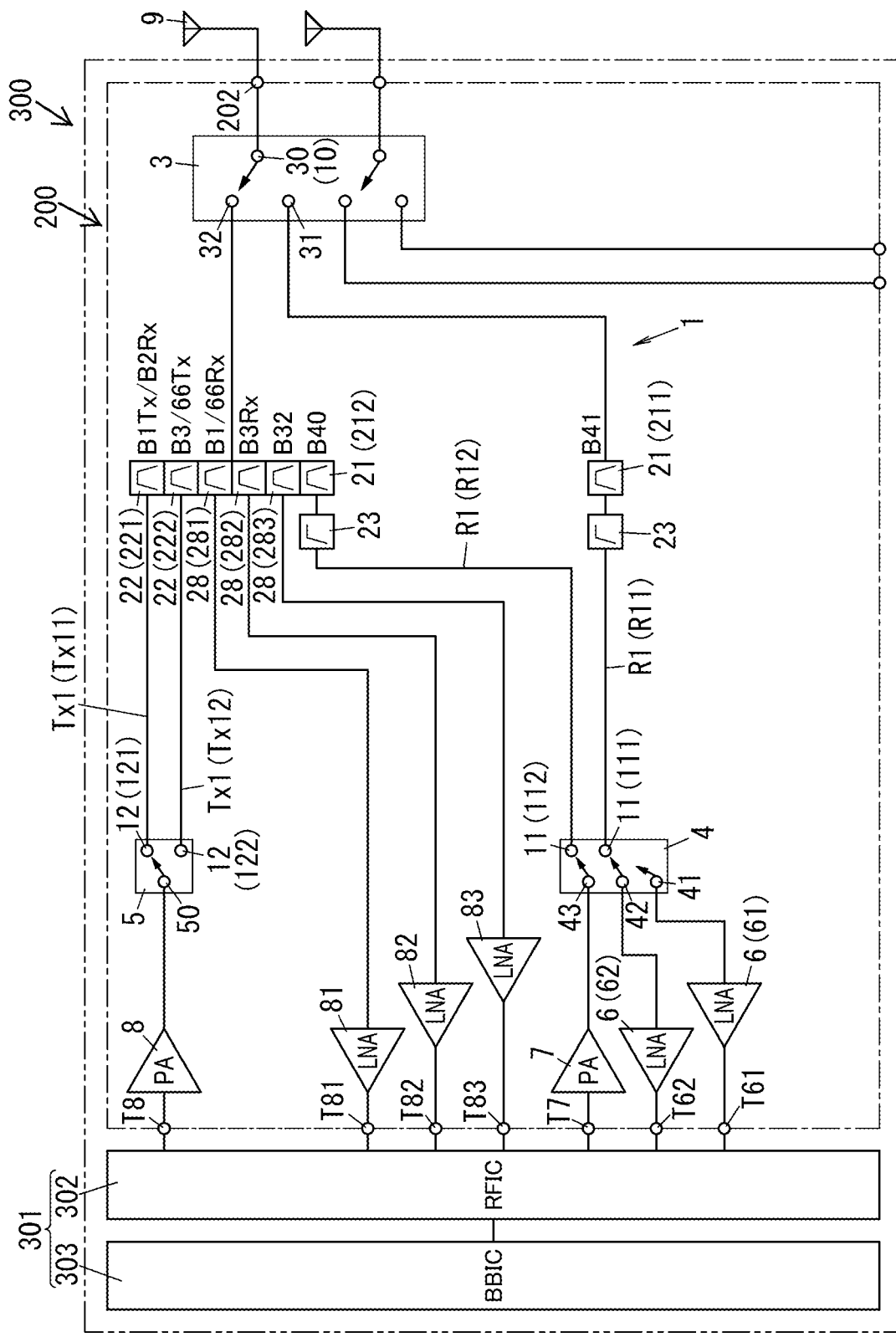
FIG. 1 depicts a circuit block diagram of a communication apparatus including a multiplexer according to a first embodiment.

Hereinafter, a multiplexer 1, a radio-frequency module 200, and a communication apparatus 300 according to a first embodiment will be described with reference to FIGS. 1 to 4.

(1) Multiplexer
(1.1) Basic Configuration of Multiplexer
The multiplexer 1 according to the first embodiment will be described with reference to FIG. 1.

The multiplexer 1 according to the first embodiment is used, for example, for a cellular phone (for example, a smartphone), a wearable terminal (for example, a smart watch), and the like that have a carrier aggregation capability.

The multiplexer 1 according to the first embodiment includes a common terminal 10, first terminals 11, second terminals 12, first filters 21, and second filters 22. The multiplexer 1 according to the first embodiment herein includes an antenna switch circuit 3, which has a terminal 30 that serves as the common terminal 10 and two selection terminals 31 and 32, which can be connected to the terminal 30. In addition, the multiplexer 1 according to the first embodiment includes a first switch circuit 4 having the first terminals 11. Further, the multiplexer 1 according to the first embodiment includes a second switch circuit 5 having the second terminals 12. The antenna switch circuit 3 includes the two selection terminals 31 and 32, which can be connected to the terminal 30, by way of non-limiting example, and may include more than two selection terminals that can be connected to the terminal 30.

The first filters 21 are disposed on receive paths R1 connecting the common terminal 10 and the first terminals 11 and pass a receive signal.

The second filters 22 are disposed on transmit paths Tx1 connecting the common terminal 10 and the second terminals 12 and pass a transmit signal.

The multiplexer 1 further includes LC filters 23. The LC filters 23 are disposed on the receive paths R1 connecting the common terminal 10 and the first terminals 11.

In addition, the multiplexer 1 further includes receive filters 28, each of which passes a receive signal in a pass band that differs from pass bands of the first filters 21. The receive filters 28 are optional elements of the multiplexer 1.

(2) Details of Multiplexer

In the following description, each element of the multiplexer 1 according to the first embodiment will be described with reference to the drawings.

(2.1) Common Terminal

The common terminal 10 is electrically connected to an antenna 9 as depicted in FIG. 1. In more detail, the common terminal 10 is electrically connected to the antenna 9 with an antenna terminal 202 interposed therebetween. The antenna terminal 202 is not an element of the multiplexer 1 and is an element of the radio-frequency module 200 including the multiplexer 1.

(2.2) First Terminals

The multiplexer 1 according to the first embodiment includes the plurality of (two) first terminals 11. In the following description, for convenience of description, in some cases, the two first terminals 11 are denoted by different numerals, and one of the two first terminals 11 is referred to as a first terminal 111 while the other of the two first terminals 11 is referred to as a first terminal 112. There is a one-to-one correspondence between the two first terminals 11 and two low-noise amplifiers 6 that amplify a receive signal, for example, in a first frequency range (for example, a high-band frequency range), and each of the two first terminals 11 can be connected to a corresponding one of the low-noise amplifiers 6. In the following description, for convenience of description, in some cases, one of the two low-noise amplifiers 6 that corresponds to the first terminal 111 is referred to as a low-noise amplifier 61, and the other of the two low-noise amplifiers 6 that corresponds to the first terminal 112 is referred to as a low-noise amplifier 62. The two first terminals 11 of the multiplexer 1 according to the first embodiment can also be connected to a power amplifier 7 that amplifies a transmit signal in the high-band frequency range. The two low-noise amplifiers 61 and the power amplifier 7 are not elements of the multiplexer 1 and are elements of the radio-frequency module 200 including the multiplexer 1.

(2.3) Second Terminals

The second terminals 12 are to be connected to a power amplifier 8 for a mid band. The multiplexer 1 according to the first embodiment includes the plurality of (two) second terminals 12. In the following description, for convenience of description, in some cases, the two second terminals 12 are denoted by different numerals, and one of the two second terminals 12 is referred to as a second terminal 121 while the other of the two second terminals 12 is referred to as a second terminal 122. Each of the two second terminals 12 can be connected to the power amplifier 8, which amplifies a transmit signal, for example, in a second frequency range (for example, a mid-band frequency range). The power amplifier 8 is not an element of the multiplexer 1 and is an element of the radio-frequency module 200 including the multiplexer 1.

(2.4) First Filters

The first filters 21 each have a pass band included, for example, in the high-band frequency range. Each of the first filters 21 passes a signal in the pass band of the first filter 21 and attenuates a signal outside the pass band. The high band corresponds to frequencies ranging, for example, from 2300 MHz to 3600 MHz. The high-band frequency range includes, for example, Band 40, Band 41, and Band 42 of the Long Term Evolution (LTE) standard established by the 3rd Generation Partnership Project (3GPP). The frequency range (communication band) of Band 40 used for TDD ranges from 2300 MHz to 2400 MHz. The frequency range of Band 41 used for TDD ranges from 2496 MHz to 2690 MHz. The downlink frequency range (receive frequencies) of Band 42 used for TDD ranges from 3400 MHz to 3600 MHz.

The first filters 21 are each a receive filter or a filter capable of TDD. In a case where the first filters 21 are capable of TDD, the multiplexer 1 can operate in a carrier aggregation mode by using TDD communication, which achieves simultaneous transmission and reception of transmit and receive signals. In a case where a filter capable of TDD is used as one of the first filters 21, the pass band of the first filter 21 for the transmit signal and the pass band of the first filter 21 for the receive signal overlap.

The pass bands of the first filters 21 are wider than the pass bands of the second filters 22. The fractional bandwidths of the first filters 21 are equal to or larger than 4.25%.

The first filters 21 are each formed by an acoustic wave filter. The acoustic wave filter is, for example, a surface acoustic wave (SAW) filter, which uses a surface acoustic wave. The acoustic wave filter is not limited to a SAW filter, which uses a surface acoustic wave, and may be, for example, an acoustic wave filter that uses a boundary acoustic wave or a plate wave. The acoustic wave filter may also be a bulk acoustic wave (BAW) filter, which uses a bulk acoustic wave. Since each of the first filters 21 is formed by an acoustic wave filter, the attenuation characteristics in the vicinity of the pass band can be improved compared with the attenuation characteristics of a filter formed by an LC filter. In addition, since each of the first filters 21 is formed by an acoustic wave filter, a Γ (reflection coefficient) in the mid band can be increased from a Γ of a filter formed by an LC filter.

The multiplexer 1 according to the first embodiment includes the plurality of (two) first filters 21. The two first filters 21 have different pass bands. In the following description, for convenience of description, one of the two first filters 21 that has a pass band corresponding to Band 41 is also referred to as a first filter 211, and the other of the two first filters 21 that has a pass band corresponding to Band 40 is also referred to as a first filter 212. In FIG. 1, to make it easy to recognize that the first filter 211 corresponds to Band 41, an expression "B41" is placed on the right hand side of the graphical symbol representing the first filter 211. Similarly, in FIG. 1, to make it easy to recognize that the first filter 212 corresponds to Band 40, an expression "B40" is placed on the right hand side of the graphical symbol representing the first filter 212.

The first filter 211 is connected to the selection terminal 31 of the antenna switch circuit 3 and the first terminal 111 of the first switch circuit 4 and passes a receive signal in the pass band of the first filter 211. The selection terminal 31 can be connected to the terminal 30 (common terminal 10) of the antenna switch circuit 3. In the following description, for convenience of description, one of the receive paths R1 that connects the common terminal 10 and the first terminal 111 is also referred to as a receive path R11.

The first filter 212 is connected to the selection terminal 32 of the antenna switch circuit 3 and the first terminal 112 of the first switch circuit 4 and passes a receive signal in the pass band of the first filter 212. The selection terminal 32 can be connected to the terminal 30 (common terminal 10) of the antenna switch circuit 3. In the following description, for convenience of description, one of the receive paths R1 that connects the common terminal 10 and the first terminal 112 is also referred to as a receive path R12.

(2.5) Second Filters

The second filters 22 each have a pass band included, for example, in the mid-band frequency range. Each of the second filters 22 passes a signal in the pass band of the second filter 22 and attenuates a signal outside the pass band. The mid band corresponds to frequencies ranging, for example, from 1710 MHz to 2200 MHz. The upper limit of the mid-band frequencies is lower than the lower limit of the high-band frequencies. The mid-band frequency range includes, for example, Band 1, Band 3, Band 2, Band 25, Band 4, Band 66, Band 34, and Band 39 of the LTE standard established by the 3GPP.

The second filters 22 are each a transmit filter or a filter capable of TDD. The uplink frequency range (transmit frequency range) of Band 1 ranges from 1920 MHz to 1980 MHz. The uplink frequency range of Band 3 ranges from 1710 MHz to 1785 MHz. The uplink frequency range of Band 2 ranges from 1850 MHz to 1910 MHz. The uplink frequency range of Band 25 ranges from 1850 MHz to 1915 MHz. The uplink frequency range of Band 4 ranges from 1710 MHz to 1755 MHz. The uplink frequency range of Band 66 ranges from 1710 MHz to 1780 MHz. The frequency range of Band 34 used for TDD ranges from 2010 MHz to 2025 MHz. The frequency range of Band 39 used for TDD ranges from 1880 MHz to 1920 MHz. In a case where the second filters 22 are capable of TDD, the multiplexer 1 can operate in a carrier aggregation mode by using TDD communication.

The multiplexer 1 according to the first embodiment includes the plurality of (two) second filters 22. The two second filters 22 have different pass bands. In the following description, for convenience of description, one of the two second filters 22 that has a pass band corresponding to the uplink frequency range of Band 1 is also referred to as a second filter 221, and the other of the two second filters 22 that has a pass band corresponding to Band 3/66 is also referred to as a second filter 222. In FIG. 1, to make it easy to recognize that the pass band of the second filter 221 corresponds to the uplink frequency range (transmit frequency range) of Band 1 and the downlink frequency range (receive frequency range) of Band 2, an expression "B1Tx/B2Rx" is placed on the right hand side of the graphical symbol representing the second filter 221. Similarly, in FIG. 1, to make it easy to recognize that the second filter 222 corresponds to the uplink frequency range of Band 3 and the uplink frequency range of Band 66, an expression "B3/66Tx" is placed on the right hand side of the graphical symbol representing the second filter 222.

The second filter 221 is connected to the second terminal 121 and the selection terminal 32 of the antenna switch circuit 3 and passes a transmit signal in the pass band of the second filter 221. The second filter 221 is disposed on a transmit path Tx1 (Tx11) connecting the common terminal 10 and the second terminal 12 (121) and passes a transmit signal.

The second filter 222 is connected to the second terminal 122 and the selection terminal 32 of the antenna switch circuit 3 and passes a transmit signal in the pass band of the second filter 222. The second filter 222 is disposed on a transmit path Tx1 (Tx12) connecting the common terminal 10 and the second terminal 12 (122) and passes a transmit signal.

(2.6) Receive Filters

The receive filters 28 each have a pass band included, for example, in the mid-band frequency range.

The multiplexer 1 according to the first embodiment includes the plurality of (three) receive filters 28. The three receive filters 28 have different pass bands. In the following description, for convenience of description, one of the three receive filters 28 that has a pass band corresponding to the downlink frequency range of Band 1 and the downlink frequency range of Band 66 is also referred to as a receive filter 281, another of the three receive filters 28 that has a pass band corresponding to the downlink frequency range of Band 3 is also referred to as a receive filter 282, and another of the three receive filters 28 that has a pass band corresponding to the downlink frequency range of Band 32 is also referred to as a receive filter 283. In FIG. 1, to make it easy to recognize that the pass band of the receive filter 281 corresponds to the downlink frequency range of Band 1 and the downlink frequency range of Band 66, an expression "B1/66Rx" is placed on the right hand side of the graphical symbol representing the receive filter 281. Similarly, in FIG. 1, to make it easy to recognize that the receive filter 282 corresponds to the downlink frequency range of Band 3, an expression "B3Rx" is placed on the right hand side of the graphical symbol representing the receive filter 282. Similarly, in FIG. 1, to make it easy to recognize that the receive filter 283 corresponds to Band 32, an expression "B32" is placed on the right hand side of the graphical symbol representing the receive filter 283.

The receive filter 281 is connected to the selection terminal 32, which can be connected to the terminal 30 (common terminal 10) in the antenna switch circuit 3, and is to be connected to, for example, a low-noise amplifier 81. The receive filter 281 passes a receive signal in the pass band of the receive filter 281. The low-noise amplifier 81 is not an element of the multiplexer 1.

The receive filter 282 is connected to the selection terminal 32, which can be connected to the terminal 30 in the antenna switch circuit 3, and is to be connected to, for example, a low-noise amplifier 82. The receive filter 282 passes a receive signal in the pass band of the receive filter 282. The low-noise amplifier 82 is not an element of the multiplexer 1.

The receive filter 283 is connected to the selection terminal 32, which can be connected to the terminal 30 in the antenna switch circuit 3, and is to be connected to, for example, a low-noise amplifier 83. The receive filter 283 passes a receive signal in the pass band of the receive filter 283. The low-noise amplifier 83 is not an element of the multiplexer 1.

(2.7) Antenna Switch Circuit

The antenna switch circuit 3 changes connections from the terminal 30 to the two selection terminals 31 and 32. The antenna switch circuit 3 can connect the terminal 30 to the two selection terminals 31 and 32 simultaneously. These connections enable the multiplexer 1 to operate in a carrier aggregation mode. The antenna switch circuit 3 is formed by, for example, a switching integrated circuit (IC).

(2.8) First Switch Circuit

The first switch circuit 4 changes connections from the first terminal 111 to two terminals 41 and 42. The first switch circuit 4 can switch between the connection from the first terminal 111 to the terminal 41 and the connection from the first terminal 111 to the terminal 42. The first switch circuit 4 can also connect the first terminal 112 to a terminal 43 or disconnect the first terminal 112 from the terminal 43. The first switch circuit 4 is formed by, for example, a switching IC.

(2.9) Second Switch Circuit

The second switch circuit 5 changes connections from a terminal 50 to the two second terminals 121 and 122. The terminal 50 is connected to the output port of the power amplifier 8. The second switch circuit 5 can switch between the connection from the terminal 50 to the second terminal 121 and the connection from the terminal 50 to the second terminal 122. The second switch circuit 5 is formed by, for example, a switching IC.

(2.10) LC Filters

Figure 2:
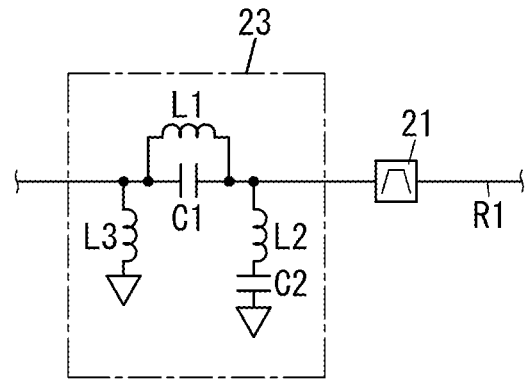
FIG. 2 depicts a circuit diagram of an LC filter of the multiplexer according to the first embodiment.

The LC filters 23 are each, for example, a high pass filter such as is depicted in FIG. 2. In the example in FIG. 2, the LC filters 23 each include two capacitors C1 and C2 and three inductors L1, L2, and L3. The LC filters 23 are each a high pass filter of the π type. Each of the LC filters 23 has a parallel circuit that is formed by the capacitor C1 and the inductor L1 and that is disposed on one of the receive paths R1 between one of the first filters 21 and one of the first terminals 11. Each of the LC filters 23 also has a series circuit that is formed by the inductor L2 and the capacitor C2 and that connects to the ground the connecting node between the parallel circuit described above and the one of the first filters 21. In addition, each of the LC filters 23 has the inductor L3, which connects to the ground the connecting node between the parallel circuit described above and the one of the first terminals 11.

The LC filters 23 are not limited to a high pass filter and may be, for example, a low pass filter or a notch filter.

(2.11) Structure of Multiplexer

Figure 3:
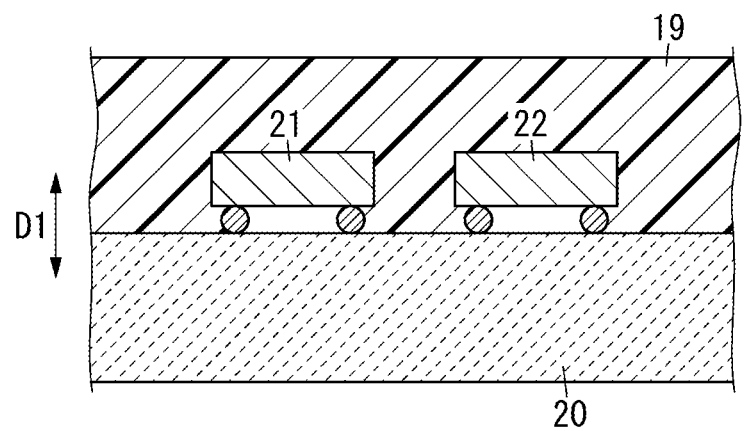
FIG. 3 depicts a cross-sectional view of the multiplexer according to the first embodiment.

As depicted in FIG. 3, the multiplexer 1 includes, for example, a board 20 on which the first filters 21 and the second filters 22 are mounted and a resin layer 19 to encapsulate the first filters 21 and the second filters 22 on the board 20. The multiplexer 1 according to the first embodiment includes the plurality of first filters 21 and the plurality of second filters 22, which are mounted on the board 20. The multiplexer 1 also includes elements other than the plurality of first filters 21 and the plurality of second filters 22 (for example, the plurality of receive filters 28 and the antenna switch circuit 3), which are mounted on the board 20.

The board 20 is, for example, a multi-layer board including a plurality of dielectric layers and a plurality of conductor pattern layers and is more specifically, a low temperature co-fired ceramics (LTCC) board. The plurality of dielectric layers and the plurality of conductor pattern layers are laminated in a thickness direction D1 of the board 20. The plurality of conductor pattern layers are each formed into a predetermined pattern. The plurality of conductor pattern layers each include one or more conductor portions in a plane perpendicular to the thickness direction D1 of the board 20. The conductor pattern layers are each made of, for example, copper. The board 20 is not limited to an LTCC board and may be, for example, a high temperature co-fired ceramics (HTCC) board or a printed circuit board.

(3) Operation of Multiplexer

The multiplexer 1 according to the first embodiment can switch between the states of the antenna switch circuit 3, between the states of the first switch circuit 4, and between the states of the second switch circuit 5. In this way, the multiplexer 1 according to the first embodiment can operate in a carrier aggregation mode based on a combination of one band selected from Band 40 and Band 41, which are in the high band, and one or two bands selected from Band 1, Band 3, Band 2, Band 25, Band 4, and Band 66, which are in the mid band. The state of the antenna switch circuit 3, the state of the first switch circuit 4, and the state of the second switch circuit 5 are controlled by a signal processing circuit 301, which is located outside, by way of non-limiting example. For example, the multiplexer 1 may include a control circuit that individually controls the antenna switch circuit 3, the first switch circuit 4, and the second switch circuit 5.

Combinations for carrier aggregation modes in which the multiplexer 1 can operate are listed herein.

Band 40+Band 1+Band 3
Band 40+Band 1
Band 40+Band 3
Band 40+Band 2 (Band 25)+Band 4 (Band 66)
Band 40+Band 2 (Band 25)
Band 40+Band 4 (Band 66)
Band 41+Band 1+Band 3
Band 41+Band 1
Band 41+Band 3
Band 41+Band 2 (Band 25)+Band 4 (Band 66)
Band 41+Band 2 (Band 25)
Band 41+Band 4 (Band 66)

For example, for the combination, Band 41+Band 3, the multiplexer 1 connects the common terminal 10 to both the two selection terminals 31 and 32 in the antenna switch circuit 3, the first terminal 111 to the terminal 41 in the first switch circuit 4, and the second terminal 122 in the second switch circuit 5 to the power amplifier 8. For the combination, Band 40+Band 1, the multiplexer 1 connects the common terminal 10 to the selection terminal 32 in the antenna switch circuit 3, the first terminal 112 to the terminal 42 in the first switch circuit 4, and the second terminal 121 to the terminal 50 in the second switch circuit 5.

(4) Characteristics of Multiplexer

Figure 4:
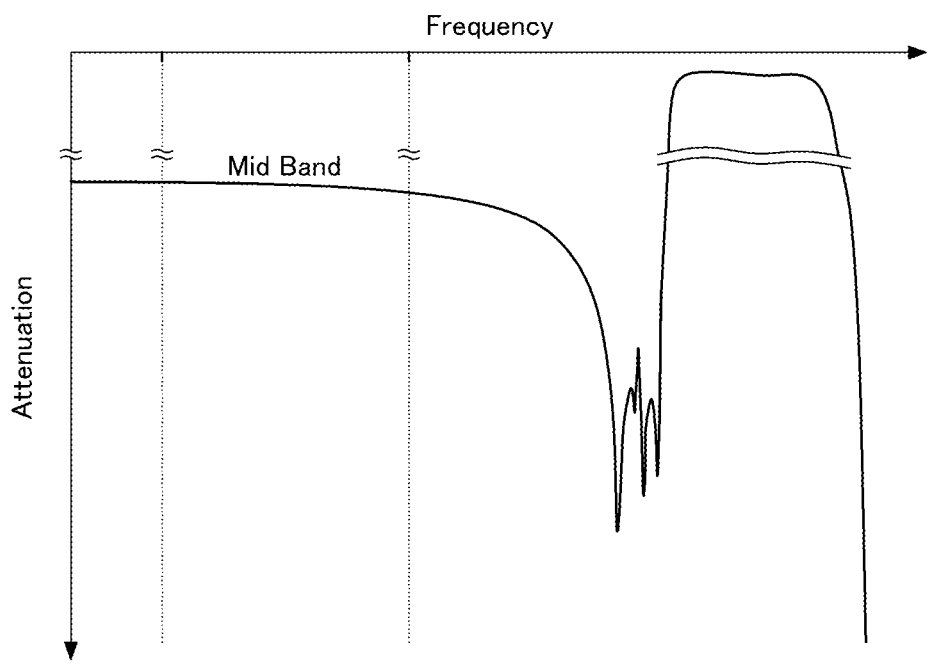
FIG. 4 depicts frequency characteristics of a multiplexer without an LC filter.
Figure 5:
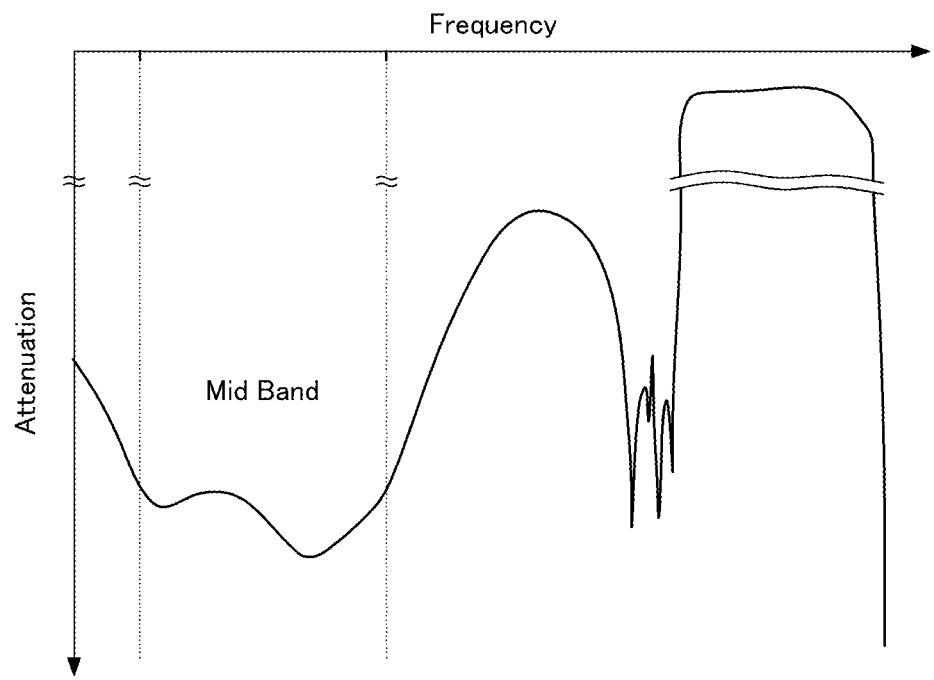
FIG. 5 depicts frequency characteristics of the multiplexer according to the first embodiment.

FIG. 5 depicts an example of frequency characteristics of the multiplexer 1 according to the first embodiment. In contrast, FIG. 4 depicts an example of frequency characteristics of a multiplexer according to a comparative example. The multiplexer according to the comparative example has a configuration similar to the configuration of the multiplexer 1 according to the first embodiment and only differs in that the LC filters 23 are not included. FIG. 5 depicts frequency characteristics for the combination of the first filters 21 and the LC filters 23. FIG. 4 depicts frequency characteristics for the first filters 21.

It can be seen from FIGS. 4 and 5 that the multiplexer 1 according to the first embodiment can improve attenuation on the receive path R1 side in the mid band compared with the multiplexer according to the comparative example.

(5) Effects

The multiplexer 1 according to the first embodiment includes the common terminal 10, the first terminals 11, the second terminals 12, the first filters 21, and the second filters 22. The first filters 21 are acoustic wave filters disposed on the receive paths R1 connecting the common terminal 10 and the first terminals 11 and pass a receive signal. The second filters 22 are disposed on transmit paths Tx1 connecting the common terminal 10 and the second terminals 12 and pass a transmit signal. The multiplexer 1 further includes the LC filters 23. The LC filters 23 are disposed on the receive paths R1 connecting the common terminal 10 and the first terminals 11. In this way, the multiplexer 1 according to the first embodiment can improve attenuation on the receive path R1 side in the pass bands of the second filters 22 in a case where the first filters 21, which pass a receive signal, are each formed by an acoustic wave filter.

Further, since the F for the combination of the first filters 21 and the LC filters 23 is nearly the same as the F for the first filters 21, the multiplexer 1 according to the first embodiment can improve attenuation on the receive paths R1 in the mid band without necessarily degrading the loss on the transmit paths Tx1 in the mid band.

(6) Other Configuration Examples of LC filters in Multiplexer

Figure 6:
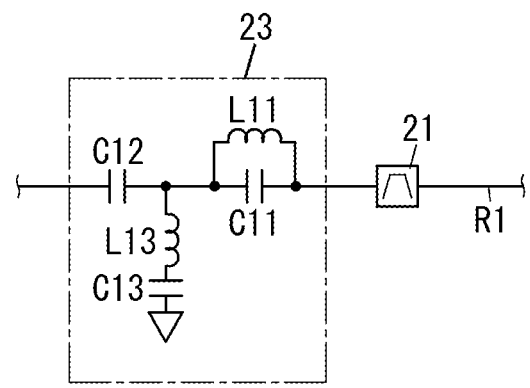
FIG. 6 depicts a circuit diagram of another example of an LC filter of the multiplexer according to the first embodiment.

The LC filters 23 may be, for example, a high pass filter of the T type such as is depicted in FIG. 6. The LC filter 23, which has a configuration depicted in FIG. 6, includes three capacitors C11, C12, and C13 and two inductors L11 and L13. The LC filter 23 depicted in FIG. 6 has a series circuit that is formed by the two capacitors C11 and C12 and that is connected to one of the first filters 21. The LC filter 23 has a series circuit that is formed by the inductor L13 and the capacitor C13 and that connects to the ground the connecting node between the two capacitors C11 and C12. Further, the inductor L11 and the capacitor C11 are connected in parallel.

(7) Radio-Frequency Module

In the following description, the radio-frequency module 200 according to the first embodiment will be described with reference to FIG. 1.

The radio-frequency module 200 according to the first embodiment is disposed, for example, in the front end portion of a cellular phone or the like that can operate in multiple modes/multiple bands and in a carrier aggregation mode.

The radio-frequency module 200 is configured so as to amplify a transmit signal received from the signal processing circuit 301 and output the transmit signal to the antenna 9. In addition, the radio-frequency module 200 is configured to amplify a receive signal received from the antenna 9 and output the receive signal to the signal processing circuit 301. The signal processing circuit 301 is not an element of the radio-frequency module 200 and is an element of the communication apparatus 300 including the radio-frequency module 200.

The radio-frequency module 200 according to the first embodiment can operate in a carrier aggregation mode. The radio-frequency module 200 includes, for example, the multiplexer 1, the low-noise amplifiers 6, and the power amplifier 8. The radio-frequency module 200 according to the first embodiment includes the two low-noise amplifiers 6.

The two low-noise amplifiers 6 can electrically be connected to the multiplexer 1. The input port of the low-noise amplifier 61, which is one of the two low-noise amplifiers 6, is connected to the terminal 41, which can be connected to the first terminal 111 in the first switch circuit 4. The output port of the low-noise amplifier 61 is connected to a signal output terminal T61, which can be connected to the signal processing circuit 301. The signal output terminal T61 is connected, for example, to the signal processing circuit 301, which is located outside the radio-frequency module 200, and used to output to the signal processing circuit 301 a radio-frequency signal (receive signal in the high band) from the low-noise amplifier 61. The low-noise amplifier 61 amplifies a receive signal in the high band that has passed the first filter 211 of the multiplexer 1 and outputs the receive signal. The input port of the low-noise amplifier 62 is connected to the terminal 42, which can be connected to the first terminal 112 in the first switch circuit 4. The output port of the low-noise amplifier 62 is connected to a signal output terminal T62, which can be connected to the signal processing circuit 301. The signal output terminal T62 is connected, for example, to the signal processing circuit 301, which is located outside the radio-frequency module 200, and used to output to the signal processing circuit 301 a radio-frequency signal (receive signal in the high band) from the low-noise amplifier 62. The low-noise amplifier 62 amplifies a receive signal in the high band that has passed the first filter 212 of the multiplexer 1 and outputs the receive signal.

The power amplifier 8 can electrically be connected to the multiplexer 1. The input port of the power amplifier 8 is connected to a signal input terminal T8, which can be connected to the signal processing circuit 301. The signal input terminal T8 is connected, for example, to the signal processing circuit 301, which is located outside the radio-frequency module 200, and used to receive a radio-frequency signal (transmit signal in the mid band) from the signal processing circuit 301. The output port of the power amplifier 8 is connected to the terminal 50, which can selectively be connected to one of the two second terminals (selection terminals in this example) 121 and 122 in the second switch circuit 5. The power amplifier 8 amplifies a transmit signal in the mid band from the signal processing circuit 301 and outputs the transmit signal.

In addition, the radio-frequency module 200 according to the first embodiment further includes the antenna terminal 202, the power amplifier 7, and the three low-noise amplifiers 81, 82, and 83.

The antenna terminal 202 is to be electrically connected to the antenna 9. The antenna terminal 202 is electrically connected to the common terminal 10 of the multiplexer 1.

The power amplifier 7 can electrically be connected to the multiplexer 1. The input port of the power amplifier 7 is connected to a signal input terminal T7. The signal input terminal T7 is electrically connected, for example, to the signal processing circuit 301, which is located outside the radio-frequency module 200, and used to receive a radio-frequency signal (transmit signal in the high band) from the signal processing circuit 301. The output port of the power amplifier 7 is connected to the terminal 43, which can selectively be connected to one of the two first terminals (selection terminals in this example) 111 and 112 in the first switch circuit 4. The power amplifier 7 amplifies a transmit signal in the high band from the signal processing circuit 301 and outputs the transmit signal.

The three low-noise amplifiers 81, 82, and 83 are electrically connected to the multiplexer 1.

The input port of the low-noise amplifier 81 is connected to the receive filter 281. The output port of the low-noise amplifier 81 is connected to a signal output terminal T81. The signal output terminal T81 is connected, for example, to the signal processing circuit 301, which is located outside the radio-frequency module 200, and used to output to the signal processing circuit 301 a radio-frequency signal (receive signal in the mid band) from the low-noise amplifier 81. The low-noise amplifier 81 amplifies a receive signal in the mid band that has passed the receive filter 281 and outputs the receive signal.

The input port of the low-noise amplifier 82 is connected to the receive filter 282. The output port of the low-noise amplifier 82 is connected to a signal output terminal T82. The signal output terminal T82 is connected, for example, to the signal processing circuit 301, which is located outside the radio-frequency module 200, and used to output to the signal processing circuit 301 a radio-frequency signal (receive signal in the mid band) from the low-noise amplifier 82. The low-noise amplifier 82 amplifies a receive signal in the mid band that has passed the receive filter 282 and outputs the receive signal.

The input port of the low-noise amplifier 83 is connected to the receive filter 283. The output port of the low-noise amplifier 83 is connected to a signal output terminal T83, which can be connected to the signal processing circuit 301. The signal output terminal T83 is connected, for example, to the signal processing circuit 301, which is located outside the radio-frequency module 200, and used to output to the signal processing circuit 301 a radio-frequency signal (receive signal in the mid band) from the low-noise amplifier 83. The low-noise amplifier 83 amplifies a receive signal in the mid band that has passed the receive filter 283 and outputs the receive signal.

The radio-frequency module 200 can be used as a radio-frequency front-end circuit capable of multiple-input multiple-output (MIMO) operation. The radio-frequency module 200 can achieve substantially simultaneous transmission and reception of a transmit signal and a receive signal by using, for example, TDD. The phrase "achieve substantially simultaneous transmission and reception" used herein indicates that transmission of a transmit signal and reception of a receive signal are not performed simultaneously but are performed in a period of time that is short enough to be regarded as a single point of time.

(8) Communication Apparatus

The communication apparatus 300 includes the radio-frequency module 200 and the signal processing circuit 301. In the communication apparatus 300, the signal processing circuit 301 also serves as a control circuit to control the antenna switch circuit 3, the first switch circuit 4, and the second switch circuit 5 of the radio-frequency module 200. The control circuit may be included in the radio-frequency module 200.

The signal processing circuit 301 includes, for example, an RF signal processing circuit 302 and a baseband signal processing circuit 303. The RF signal processing circuit 302 is formed, for example, by a radio-frequency integrated circuit (RFIC) and performs signal processing on a radio-frequency signal. The RF signal processing circuit 302 performs, for example, signal processing, such as up conversion, on a radio-frequency signal (transmit signal) that is output from the baseband signal processing circuit 303 and outputs the radio-frequency signal that has undergone the signal processing. The baseband signal processing circuit 303 is formed, for example, by a baseband integrated circuit (BBIC) and performs predetermined signal processing on a transmit signal received from outside the signal processing circuit 301. A receive signal processed by the baseband signal processing circuit 303 is used, for example, in the form of an image signal for image display or in the form of a speech signal for voice transmission. The radio-frequency module 200 conveys a radio-frequency signal (receive signal and transmit signal) from the antenna 9 to the RF signal processing circuit 302 of the signal processing circuit 301 or vice versa. The baseband signal processing circuit 303 is not an indispensable element in the communication apparatus 300.

Second Embodiment

Figure 7:
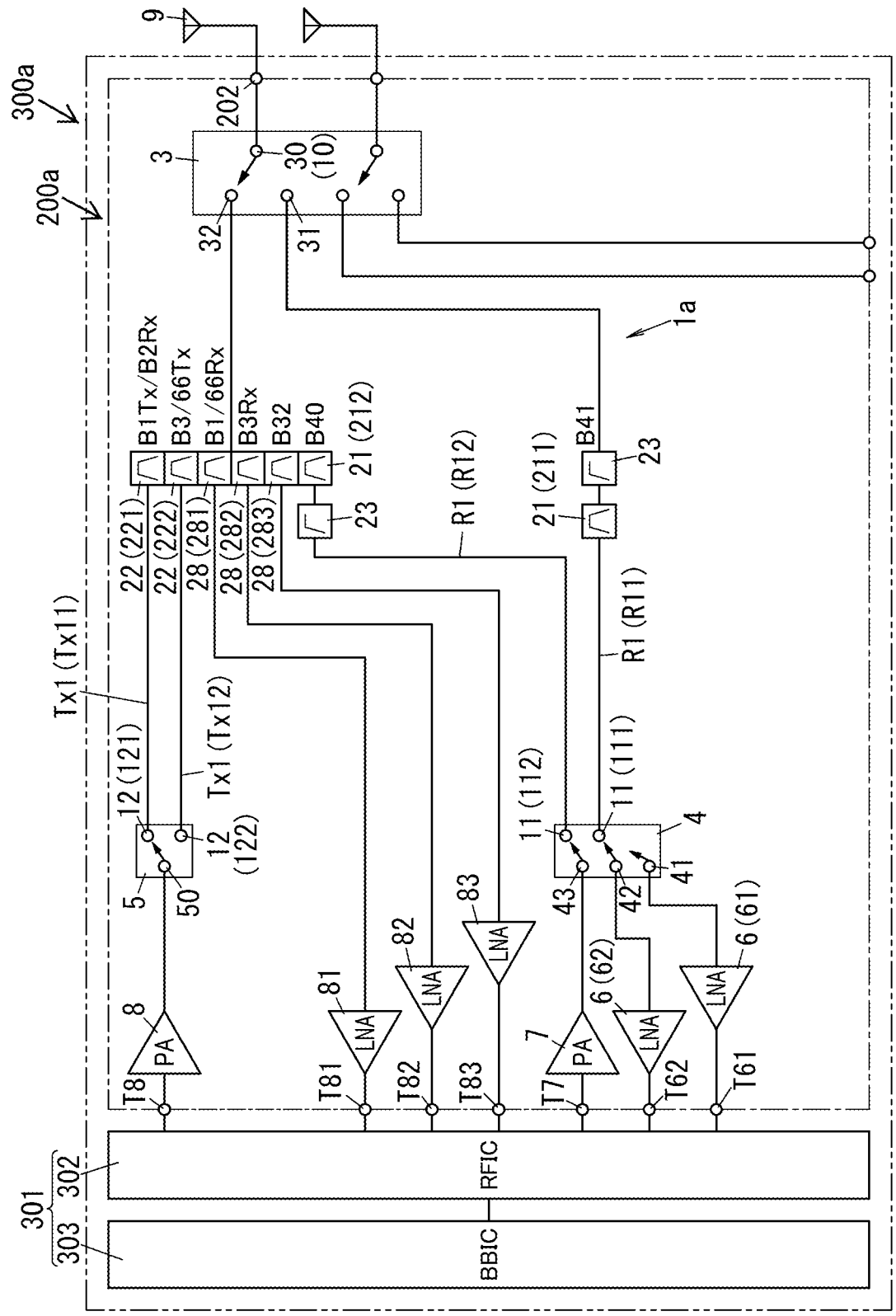
FIG. 7 depicts a circuit block diagram of a communication apparatus including a multiplexer according to a second embodiment.

A multiplexer 1a, a radio-frequency module 200a, and a communication apparatus 300a according to a second embodiment will be described herein with reference to FIGS. 7 and 8. Elements of the multiplexer 1a, the radio-frequency module 200a, and the communication apparatus 300a according to the second embodiment that are the same as or similar to the elements of the multiplexer 1, the radio-frequency module 200, and the communication apparatus 300 according to the first embodiment, respectively, are denoted by the same numerals or symbols and will not be described.

The multiplexer 1a according to the second embodiment differs from the multiplexer 1a according to the first embodiment in that the LC filter 23 located on the receive path R11 is located on the common terminal 10 side of the first filter 211.

Figure 8:
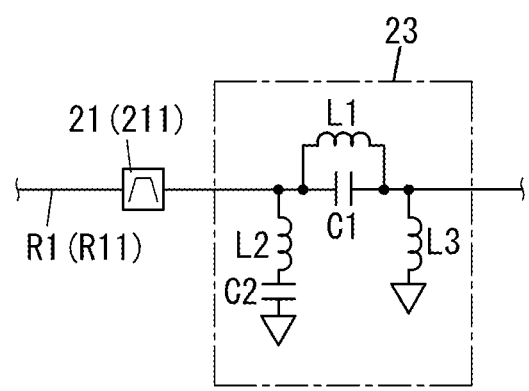
FIG. 8 depicts a circuit diagram of an LC filter of the multiplexer according to the second embodiment.

The LC filters 23 in the multiplexer 1a according to the second embodiment are each a high pass filter of the n type such as is depicted, for example, in FIG. 8. The circuit configuration of each of the LC filters 23 herein is similar to the circuit configuration depicted in FIG. 2.

Similarly to the multiplexer 1, the radio-frequency module 200, and the communication apparatus 300 according to the first embodiment, the multiplexer 1a, the radio-frequency module 200a, and the communication apparatus 300a according to the second embodiment can improve attenuation on the receive path R1 side in the pass bands of the second filters 22 in a case where the first filters 21, which pass a receive signal, are each an acoustic wave filter.

Third Embodiment

Figure 9:
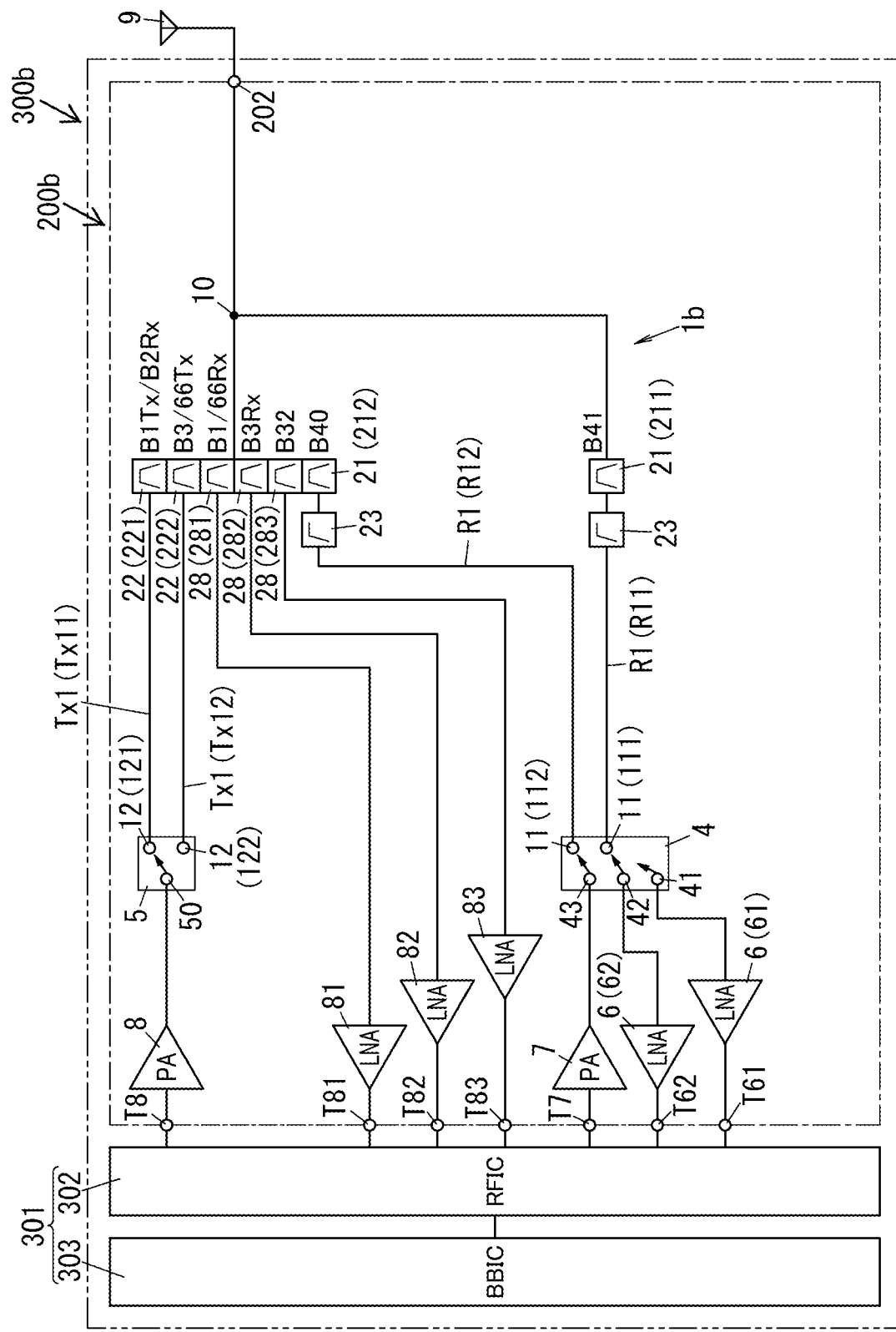
FIG. 9 depicts a circuit block diagram of a multiplexer according to a third embodiment.

A multiplexer 1b, a radio-frequency module 200b, and a communication apparatus 300b according to a third embodiment will be described herein with reference to FIG. 9. Elements of the multiplexer 1b, the radio-frequency module 200b, and the communication apparatus 300b according to the third embodiment that are the same as or similar to the elements of the multiplexer 1, the radio-frequency module 200, and the communication apparatus 300 according to the first embodiment, respectively, are denoted by the same numerals or symbols and will not be described.

The multiplexer 1b according to the third embodiment differs from the multiplexer 1 according to the first embodiment in that the multiplexer 1b does not include the antenna switch circuit 3.

Figure 10:
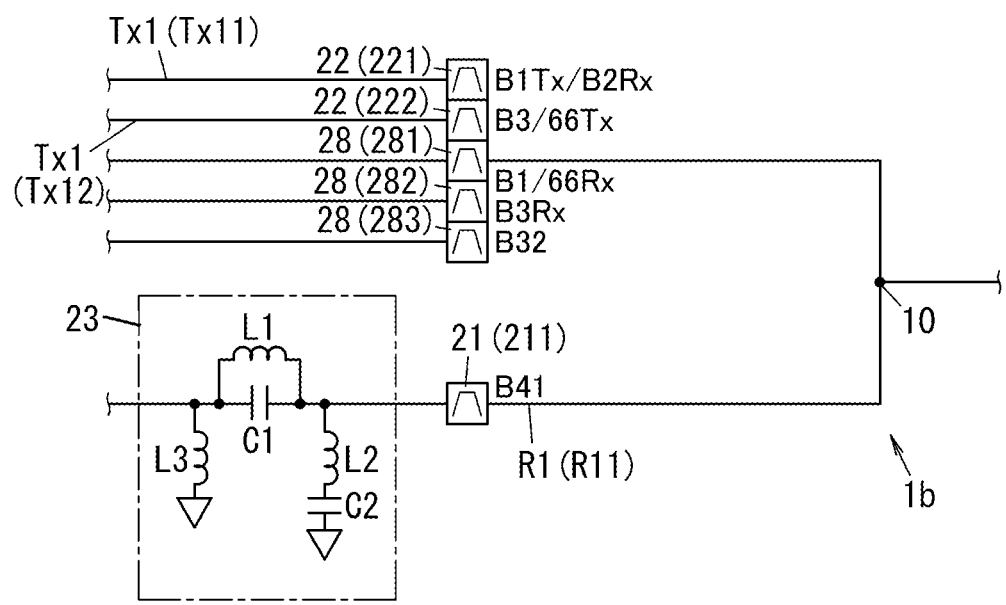
FIG. 10 describes an LC filter of the multiplexer according to the third embodiment.

The LC filters 23 in the multiplexer 1b according to the third embodiment are each a high pass filter of the n type such as is depicted, for example, in FIG. 10. The circuit configuration of each of the LC filters 23 herein is similar to the circuit configuration depicted in FIG. 2. In FIG. 10, the receive path R1 (R12) in FIG. 9 and the first filter 212 and the LC filter 23 on the receive path R1 (R12) are not illustrated.

Figure 11:
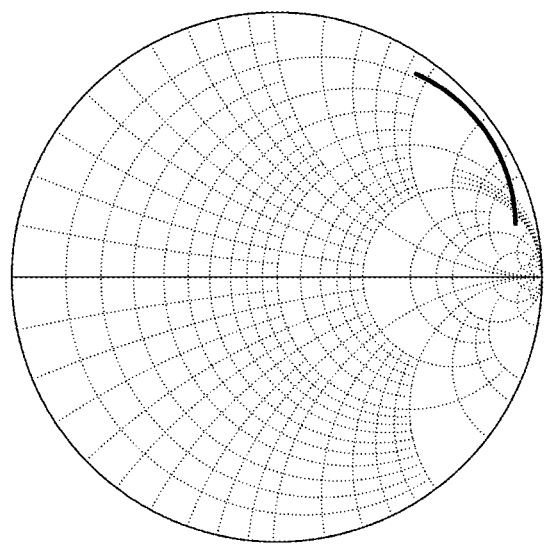
FIG. 11 depicts a Smith chart of the multiplexer according to the third embodiment.

FIG. 11 depicts the impedance of the second filter 22 side as viewed from the first filter 211 expressed on a Smith chart when the multiplexer 1b according to the third embodiment operates in a carrier aggregation mode based on a combination of Band 41 and Band 1. A large Γ in the mid band can be seen from FIG. 11, indicating closeness to an open phase. This behavior indicates that the receive paths R1 are unlikely to be subject to an effect from the transmit path Tx1 side when the multiplexer 1b according to the third embodiment operates in a carrier aggregation mode based on a combination of Band 41 and Band 1.

Similarly to the multiplexer 1, the radio-frequency module 200, and the communication apparatus 300 according to the first embodiment, the multiplexer 1b, the radio-frequency module 200b, and the communication apparatus 300b according to the third embodiment can improve attenuation on the receive path R1 side in the pass bands of the second filters 22 in a case where the first filters 21, which pass a receive signal, are each an acoustic wave filter.

Figure 12:
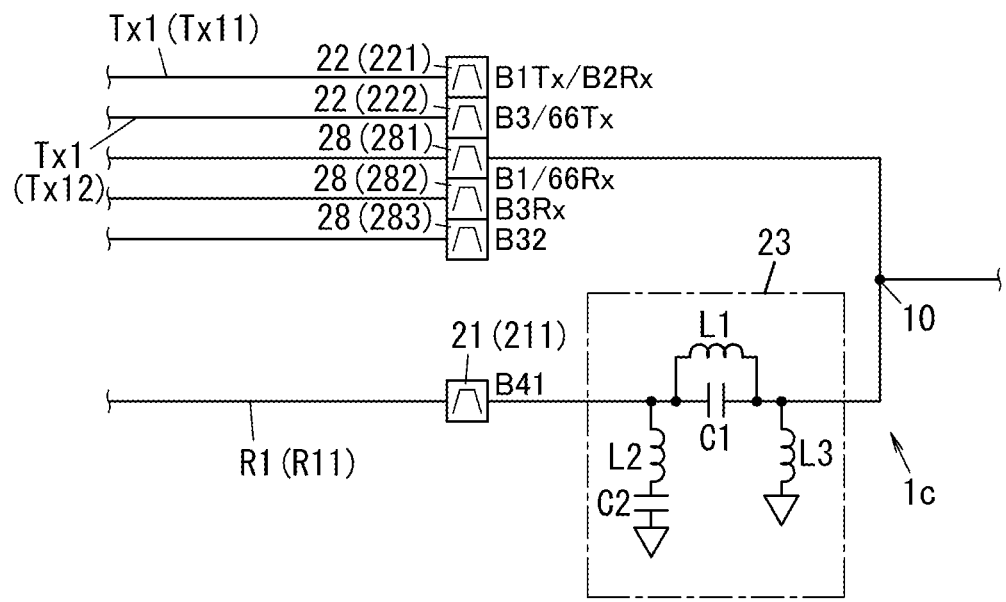
FIG. 12 describes an LC filter of a multiplexer according to a modification of the third embodiment.

A multiplexer 1c according to a modification of the third embodiment differs from the multiplexer 1b according to the third embodiment in that the LC filter 23 located on the receive path R1 is located between the first filter 211 and the common terminal 10, as depicted in FIG. 12.

Figure 13:
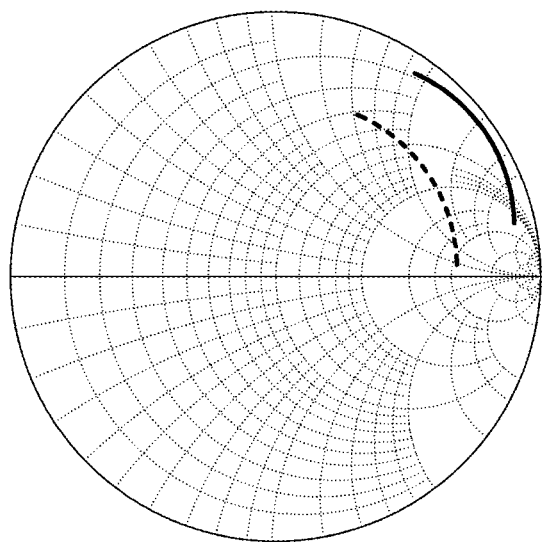
FIG. 13 depicts a Smith chart of the multiplexer according to the modification of the third embodiment.

FIG. 13 depicts the impedance of the second filter 22 side as viewed from the first filter 211 expressed on a Smith chart when the multiplexer 1c according to the modification of the third embodiment operates in a carrier aggregation mode based on a combination of Band 41 and Band 1. Since matching does not achieve an open phase in a case where the Γ in the mid band is small, as is depicted by frequency characteristics represented by a dashed line in FIG. 13, the LC filter 23, which is located at a position depicted in FIG. 12, also serves as a tank circuit and thus increases the Γ in the mid band, achieving closeness to an open phase, as is depicted by frequency characteristics represented by a solid line in FIG. 13. This behavior indicates that the receive paths R1 are unlikely to be subject to an effect from the transmit path Tx1 side when the multiplexer 1c according to the modification of the third embodiment operates in a carrier aggregation mode based on a combination of Band 41 and Band 1.

Similarly to the multiplexer 1b according to the third embodiment, the multiplexer 1c according to the modification of the third embodiment can improve attenuation on the receive path R1 side in the pass bands of the second filters 22 in a case where the first filters 21, which pass a receive signal, are each an acoustic wave filter.

Fourth Embodiment

Figure 14:
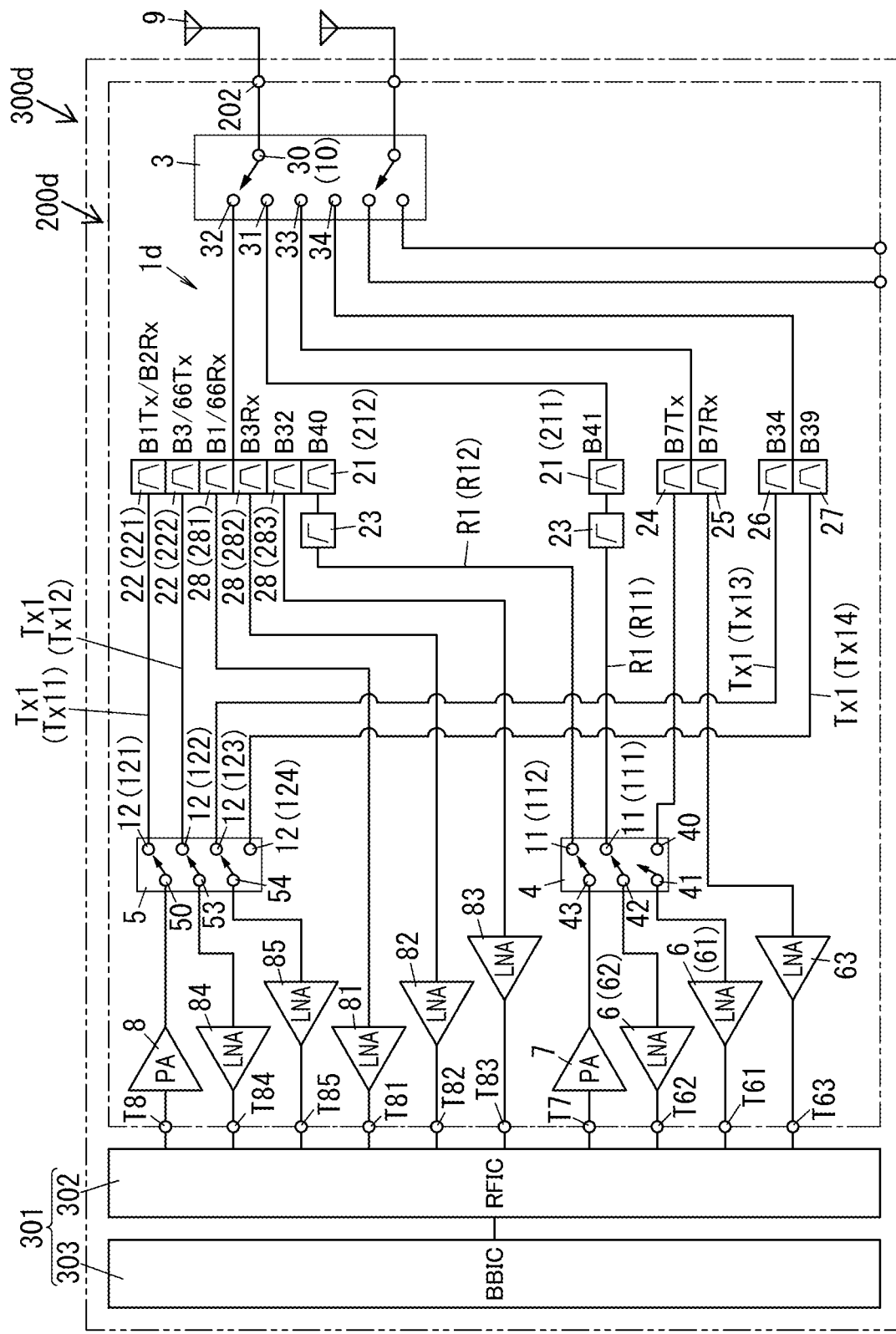
FIG. 14 depicts a circuit block diagram of a communication apparatus including a multiplexer according to a fourth embodiment.

A multiplexer 1d, a radio-frequency module 200d, and a communication apparatus 300d according to a fourth embodiment will be described herein with reference to FIG. 14. Elements of the multiplexer 1d, the radio-frequency module 200d, and the communication apparatus 300d according to the fourth embodiment that are the same as or similar to the elements of the multiplexer 1, the radio-frequency module 200, and the communication apparatus 300 according to the first embodiment, respectively, are denoted by the same numerals or symbols and will not be described.

The multiplexer 1d according to the fourth embodiment differs from the multiplexer 1 according to the first embodiment in that the multiplexer 1d further includes a filter (second filter) 26 of Band 34 and a filter (second filter) 27 of Band 39 as filters having a pass band in the mid band. In FIG. 14, to make it easy to recognize that the filter 26 corresponds to Band 34, an expression "B34" is placed on the right hand side of the graphical symbol representing the filter 26. Similarly, in FIG. 14, to make it easy to recognize that the filter 27 corresponds to Band 39, an expression "B39" is placed on the right hand side of the graphical symbol representing the filter 27. The filters 26 and 27 are capable of TDD.

In addition, the multiplexer 1d according to the fourth embodiment differs from the multiplexer 1 according to the first embodiment in that the multiplexer 1d further includes a filter 24 having a pass band corresponding to the uplink frequency range of Band 7 and a filter 25 having a pass band corresponding to the downlink frequency range of Band 7 as filters having a pass band in the high band. In FIG. 14, to make it easy to recognize that the filter 24 is a transmit filter of Band 7, an expression "B7Tx" is placed on the right hand side of the graphical symbol representing the filter 24. In addition, in FIG. 14, to make it easy to recognize that the filter 25 is a receive filter of Band 7, an expression "B7Rx" is placed on the right hand side of the graphical symbol representing the filter 25.

The antenna switch circuit 3 of the multiplexer 1 according to the fourth embodiment further includes selection terminals 33 and 34. The selection terminal 33 is connected to the filters 24 and 25. The selection terminal 34 is connected to the filters 26 and 27.

The multiplexer 1d according to the fourth embodiment differs from the multiplexer 1 according to the first embodiment in that the first switch circuit 4 further includes a terminal 40 connected to the filter 24.

The multiplexer 1d according to the fourth embodiment differs from the multiplexer 1 according to the first embodiment in that the second switch circuit 5 further includes two second terminals 12 (123) and 12 (124) in addition to the two second terminals 121 and 122. The second terminal 123 is connected to the filter 26. The second terminal 124 is connected to the filter 27. The second terminals 121 to 124 can be connected to the terminal 50. The filter 26 is disposed on a transmit path Tx1 (Tx13) connecting the common terminal 10 and the second terminal 12 (123) and passes a transmit signal. The filter 27 is disposed on a transmit path Tx1 (Tx14) connecting the common terminal 10 and the second terminal 12 (124) and passes a transmit signal. The second switch circuit 5 further includes a terminal 53 and a terminal 54. The terminal 53 can be connected to the second terminal 123, and the terminal 54 can be connected to the second terminal 124.

The radio-frequency module 200d according to the fourth embodiment includes the multiplexer 1d instead of the multiplexer 1 of the radio-frequency module 200 according to the first embodiment. The radio-frequency module 200d according to the fourth embodiment differs from the radio-frequency module 200 according to the first embodiment in that the radio-frequency module 200d further includes low-noise amplifiers 63, 84, and 85.

The input port of the low-noise amplifier 63 is connected to the filter 25. The output port of the low-noise amplifier 63 is connected to a signal output terminal T63, which can be connected to the signal processing circuit 301. The signal output terminal T63 is connected, for example, to the signal processing circuit 301, which is located outside the radio-frequency module 200d, and used to output to the signal processing circuit 301 a radio-frequency signal (receive signal in the high band) from the low-noise amplifier 63. The low-noise amplifier 63 amplifies a receive signal in the high band that has passed the filter 25 of the multiplexer 1*d* and outputs the receive signal.

The input port of the low-noise amplifier 84 is connected to the terminal 53 of the second switch circuit 5. The output port of the low-noise amplifier 84 is connected to a signal output terminal T84, which can be connected to the signal processing circuit 301. The signal output terminal T84 is connected, for example, to the signal processing circuit 301, which is located outside the radio-frequency module 200*d*, and used to output to the signal processing circuit 301 a radio-frequency signal (receive signal in the mid band) from the low-noise amplifier 84. The low-noise amplifier 84 amplifies a receive signal in the mid band that has passed the filter 26 of the multiplexer 1*d* and outputs the receive signal.

The input port of the low-noise amplifier 85 is connected to the terminal 54 of the second switch circuit 5. The output port of the low-noise amplifier 85 is connected to a signal output terminal T85, which can be connected to the signal processing circuit 301. The signal output terminal T85 is connected, for example, to the signal processing circuit 301, which is located outside the radio-frequency module 200*d*, and used to output to the signal processing circuit 301 a radio-frequency signal (receive signal in the mid band) from the low-noise amplifier 85. The low-noise amplifier 85 amplifies a receive signal in the mid band that has passed the filter 27 of the multiplexer 1*d* and outputs the receive signal.

The multiplexer 1*d* according to the fourth embodiment can operate in a carrier aggregation mode based on a combination of one band selected from Band 40 and Band 41, which are in the high band, and one or two bands selected from Band 1, Band 3, Band 2, Band 25, Band 4, Band 66, Band 39, and Band 34, which are in the mid band.

Combinations for carrier aggregation modes in which the multiplexer 1*d* can operate are listed herein.

Band 40+Band 1+Band 3
Band 40+Band 1
Band 40+Band 3
Band 40+Band 2 (Band 25)+Band 4 (Band 66)
Band 40+Band 2 (Band 25)
Band 40+Band 4 (Band 66)
Band 41+Band 1+Band 3
Band 41+Band 1
Band 41+Band 3
Band 41+Band 2 (Band 25)+Band 4 (Band 66)
Band 41+Band 2 (Band 25)
Band 41+Band 4 (Band 66)
Band 41+Band 34+Band 39
Band 41+Band 34
Band 41+Band 39

Similarly to the multiplexer 1, the radio-frequency module 200, and the communication apparatus 300 according to the first embodiment, the multiplexer 1*d*, the radio-frequency module 200*d*, and the communication apparatus 300*d* according to the fourth embodiment can improve attenuation on the receive path R1 side in the pass bands of the second filters 22 in a case where the first filters 21, which pass a receive signal, are each an acoustic wave filter.

Fifth Embodiment

Figure 15:
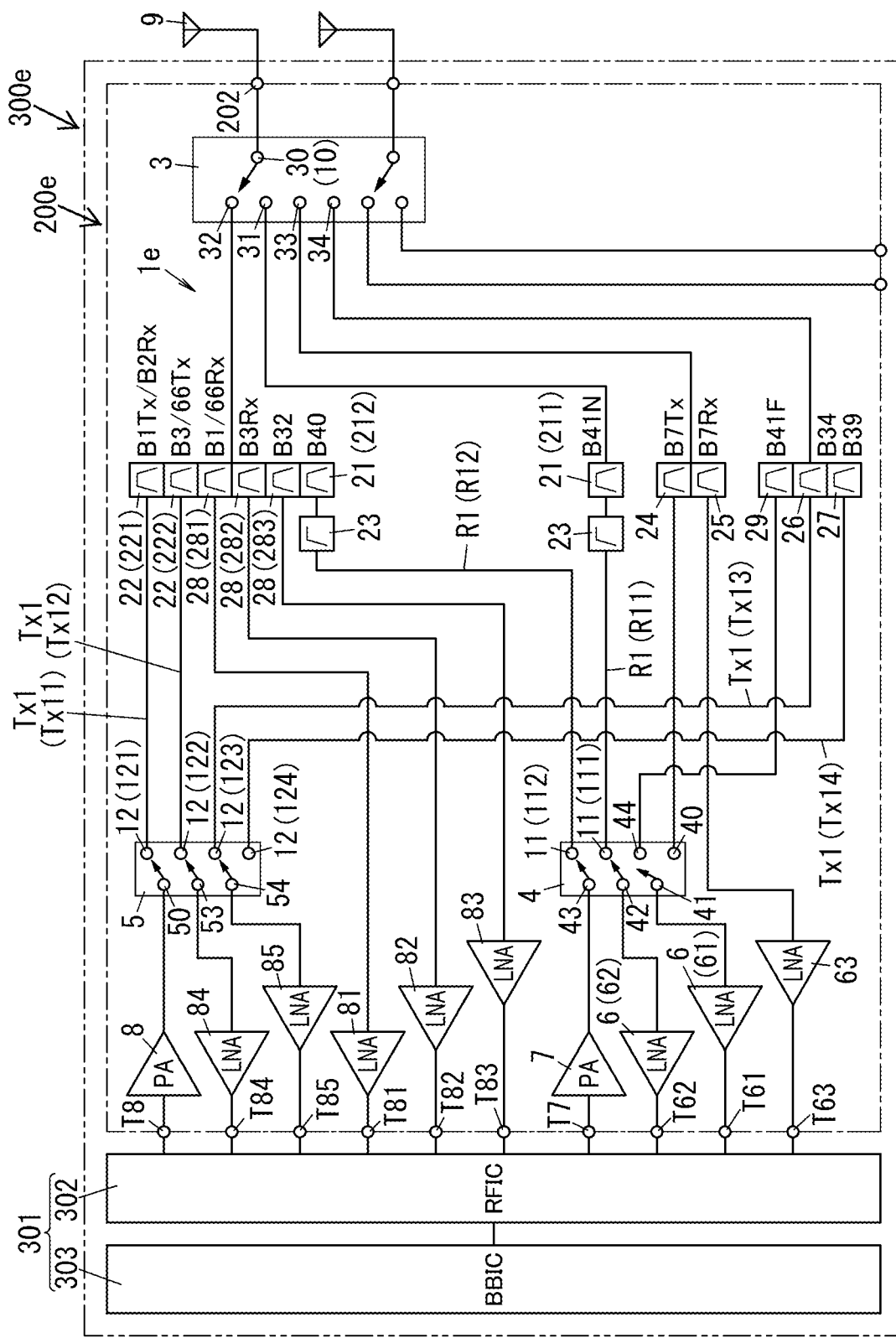
FIG. 15 depicts a circuit block diagram of a communication apparatus including a multiplexer according to a fifth embodiment.

A multiplexer 1*e*, a radio-frequency module 200*e*, and a communication apparatus 300*e* according to a fifth embodiment will be described herein with reference to FIG. 15. Elements of the multiplexer 1*e*, the radio-frequency module 200*e*, and the communication apparatus 300*e* according to the fifth embodiment that are the same as or similar to the elements of the multiplexer 1*d*, the radio-frequency module 200*d*, and the communication apparatus 300*d* according to the fourth embodiment, respectively, are denoted by the same numerals or symbols and will not be described.

In the multiplexer 1*e* according to the fifth embodiment, a pass band of the first filter 21 (211), which is connected to the first terminal 11 (111), is a portion of the frequency range (communication band) of Band 41. The pass band of the first filter 211 ranges, for example, from 2545 MHz to 2650 MHz. In the following description, for convenience of description, a portion of the frequency range of Band 41 is referred to as the B41 narrow band, and the entire frequency range of Band 41 is also referred to as the B41 full band. In other words, the frequency range of the B41 narrow band ranges, for example, from 2545 MHz to 2650 MHz. The lower limit of the frequency range of the B41 narrow band is higher than, for example, the upper limit of the frequency range of the Wi-Fi (registered trademark) of the 2.4 GHz band. In FIG. 15, to make it easy to recognize that the first filter 211 corresponds to the B41 narrow band, an expression "B41N" is placed on the right hand side of the graphical symbol representing the first filter 211.

In addition to the first filter 211, the multiplexer 1*e* according to the fifth embodiment further includes a third filter 29, which passes a receive signal in the frequency range of Band 41. A pass band of the third filter 29 is the entire frequency range of Band 41. In FIG. 15, to make it easy to recognize that the third filter 29 corresponds to the B41 full band, an expression "B41F" is placed on the right hand side of the graphical symbol representing the third filter 29.

In the multiplexer 1*e* according to the fifth embodiment, the LC filter 23, which is a notch filter, is disposed on the receive path R1 (R11) between the first filter 21 (211), which has the pass band corresponding to the B41 narrow band, and the first terminal 111. In the multiplexer 1*e* according to the fifth embodiment, the LC filter 23 is not disposed between the third filter 29, which has the pass band corresponding to the B41 full band, and a terminal 44 of the first switch circuit 4. In the first switch circuit 4, the terminal 44 can be connected to the terminal 42.

Similarly to the multiplexer 1*d*, the radio-frequency module 200*d*, and the communication apparatus 300*d* according to the fourth embodiment, the multiplexer 1*e*, the radio-frequency module 200*e*, and the communication apparatus 300*e* according to the fifth embodiment can improve attenuation on the receive path R1 side in the pass bands of the second filters 22 in a case where the first filters 21, which pass a receive signal, are each an acoustic wave filter.

When operating in a carrier aggregation mode by using Band 41, the multiplexer 1*e* according to the fifth embodiment uses the first filter 211, which has the pass band corresponding to the B41 narrow band, instead of the third filter 29, which has the pass band corresponding to the B41 full band. In this way, when the multiplexer 1*e*, the radio-frequency module 200*e*, and the communication apparatus 300*e* according to the fifth embodiment operate in a carrier aggregation mode, for example, based on a combination of Band 41 (Band 41 narrow band) and at least one band selected from Band 1 and Band 3, the effect of a receive signal in the high band on the Wi-Fi (registered trademark) in the 2.4 GHz band can be reduced.

Each of the first to fifth embodiments described above only represents one of the various embodiments of the present disclosure. Various changes can be made to the first to fifth embodiments described above in accordance with design.

For example, although the multiplexers 1 to 1e each include the plurality of first filters 21, at least one first filter 21 needs to be included. Further, although the multiplexers 1 to 1e each include the plurality of second filters 22, at least one second filter 22 needs to be included.

(Summarization)

The following aspects are disclosed in the present specification in accordance with the embodiments and the modification described above.

The multiplexer (1; 1a; 1b; 1c; 1d; or 1e) according to a first aspect includes the common terminal (10), the first terminal (11), the second terminal (12), the first filter (21), and the second filter (22). The first filter (21) is an acoustic wave filter disposed on the receive path (R1) connecting the common terminal (10) and the first terminal (11) and passes a receive signal. The second filter (22) is disposed on the transmit path (Tx1) connecting the common terminal (10) and the second terminal (12) and passes a transmit signal. The multiplexer (1; 1a; 1b; 1c; 1d; or 1e) according to the first aspect further includes the LC filter (23). The LC filter (23) is disposed on the receive path (R1) connecting the common terminal (10) and the first terminal (11).

The multiplexer (1; 1a; 1b; 1c; 1d; or 1e) according to the first aspect can improve attenuation on the receive path (R1) side in the pass band of the second filter (22) in a case where the first filter (21), which passes a receive signal, is an acoustic wave filter. The multiplexer (1; 1a; 1b; 1c; 1d; or 1e) according to the first aspect can operate in a carrier aggregation mode and can reduce the leak of a transmit signal, which is conveyed on the transmit path (Tx1), to the receive path (R1) during the operation in the carrier aggregation mode. Thus, the reception characteristics are unlikely to be affected by a transmit signal when the multiplexer (1; 1a; 1b; 1c; 1d; or 1e) according to the first aspect operates in a carrier aggregation mode.

In the multiplexer (1; 1a; 1b; 1c; 1d; or 1e) according to a second aspect, the LC filter (23) in the first aspect is a high pass filter, a low pass filter, or a notch filter.

The multiplexer (1; 1a; 1b; 1c; 1d; or 1e) according to the second aspect can improve attenuation on the receive path (R1) side in the pass band of the second filter (22).

In the multiplexer (1; 1a; 1b; 1c; 1d; or 1e) according to a third aspect, a pass band of the first filter (21) is wider than a pass band of the second filter (22) in the first or second aspects.

In the multiplexer (1; 1a; 1b; 1c; 1d; or 1e) according to a fourth aspect, a fractional bandwidth of the first filter (21) in any one of the first to third aspects is equal to or larger than 4.25%.

The multiplexer (1; 1a; 1b; 1c; 1d; or 1e) according to a fifth aspect further includes the board (20) and the resin layer (19) in any one of the first to fourth aspects. The first filter (21) and the second filter (22) are mounted on the board (20). The resin layer (19) encapsulates the first filter (21) and the second filter (22) on the board (20).

In the multiplexer (1; 1a; 1b; 1c; 1d; or 1e) according to a sixth aspect, the first filter (21) is a receive filter or a filter capable of TDD in any one of the first to fifth aspects.

In the multiplexer (1; 1a; 1b; 1c; 1d; or 1e) according to a seventh aspect, the second filter (22) is a transmit filter or a filter capable of TDD in any one of the first to sixth aspects.

The multiplexer (1e) according to an eighth aspect further includes the third filter (29) in any one of the first to seventh aspects. The third filter (29) passes a receive signal in a frequency range of Band 41. A pass band of the first filter (211) is a portion of the frequency range of Band 41. The LC filter (23) is a notch filter.

The multiplexer (1e) according to the eighth aspect can reduce, for example, the effect on the Wi-Fi (registered trademark) of the 2.4 GHz band, whose frequency range partially overlaps Band 41, compared with a case where the pass band of the first filter (211) is the entire frequency range of Band 41.

In the multiplexer (1; 1a; or 1b) according to a ninth aspect, the first filter (21) is a receive filter that passes a receive signal in a frequency range of Band 41 or a receive signal in a frequency range of Band 40 in any one of the first to fifth aspects.

The multiplexer (1; 1a; or 1b) according to the ninth aspect can use Band 41 or Band 40 as the high band in a combination of the high band and the mid band in a carrier aggregation mode.

In the multiplexer (1; 1a; or 1b) according to a tenth aspect, the second filter (22) is a transmit filter that passes a transmit signal in a frequency range of Band 1 or a transmit signal in a frequency range of Band 3 in the ninth aspect.

The multiplexer (1; 1a; or 1b) according to the tenth aspect can use Band 1 or Band 3 as the mid band in a combination of the high band and the mid band in a carrier aggregation mode.

The radio-frequency module (200; 200a; 200b; 200d; or 200e) according to an eleventh aspect includes the multiplexer (1; 1a; 1b; 1c; 1d; or 1e) in any one of the first to tenth aspects, the low-noise amplifier (6), and the power amplifier (8). The low-noise amplifier (6) can be connected to the first terminal (11). The power amplifier (8) can be connected to the second terminal (12).

The radio-frequency module (200; 200a; 200b; 200d; or 200e) according to the eleventh aspect can improve attenuation on the receive path (R1) side in the pass band of the second filter (22) in a case where the first filter (21), which passes a receive signal, is an acoustic wave filter.

The communication apparatus (300; 300a; 300b; 300d; or 300e) according to a twelfth aspect includes the radio-frequency module (200; 200a; 200b; 200d; or 200e) in the eleventh aspect and the signal processing circuit (301). The signal processing circuit (301) processes the transmit signal and the receive signal.

The communication apparatus (300; 300a; 300b; 300d; or 300e) according to the twelfth aspect can improve attenuation on the receive path (R1) side in the pass band of the second filter (22) in a case where the first filter (21), which passes a receive signal, is an acoustic wave filter.

REFERENCE SIGNS LIST 1, 1a, 1b, 1c, 1d, 1e Multiplexer
3 Antenna Switch Circuit
4 First Switch Circuit
5 Second Switch Circuit
6, 61, 62, 63 Low-Noise Amplifier
7 Power Amplifier
8 Power Amplifier
9 Antenna
10 Common Terminal
11, 111, 112 First Terminal
12, 121, 122, 123, 124 Second Terminal
21 First Filter
211, 212 First Filter
22 Second Filter
221, 222 Second Filter 23 LC Filter
24 Filter
25 Filter
26 Filter
27 Filter
28, 281, 282, 283 Receive Filter
29 Third Filter
30 Terminal
31, 32, 33, 34 Selection Terminal
40, 41, 42, 43, 44 Terminal
81, 82, 83, 84, 85 Low-Noise Amplifier
200, 200a, 200b, 200d, 200e Radio-Frequency Module
202 Antenna Terminal
300, 300a, 300b, 300d, 300e Communication Apparatus
301 Signal Processing Circuit
302 RF Signal Processing Circuit
303 Baseband Signal Processing Circuit
C1, C2, C11, C12, C13 Capacitor
L1, L2, L3, L11, L13 Inductor
R1, R11, R12 Receive Path
Tx1, Tx11, Tx12, Tx13, Tx14 Transmit Path
T7, T8 Signal Input Terminal
T61, T62, T63, T81, T82, T83, T84, T85 Signal Output Terminal

The invention claimed is:

1. A multiplexer comprising:
a common terminal;
a first terminal;
a second terminal;
a switch connected between the common terminal and the first terminal, and between the common terminal and the second terminal, and including a third terminal, a first selection terminal configured to connect to the third terminal, a second selection terminal configured to connect to the third terminal, and a third selection terminal configured to connect to the third terminal;
a first filter that is connected to the first selection terminal, that is an acoustic wave filter, and that is in a first receive path, the first receive path connecting the common terminal and the first terminal and being configured to pass receive signals of a portion of a first band;
a second filter that is connected to the second selection terminal and that is in a transmit path, the transmit path connecting the common terminal and the second terminal and being configured to pass transmit signals of a second band different from the first band;
a third filter that is connected to the third selection terminal and that is in a second receive path, the second receive path connecting the common terminal and the first terminal and being configured to pass receive signals of the first band; and
an LC filter in the first receive path,
wherein the switch is configured to connect the third terminal to the first selection terminal and to the second selection terminal simultaneously, and is configured to not connect the third terminal to the second selection terminal and to the third selection terminal simultaneously, and
wherein there is no LC filter in the second receive path.

2. The multiplexer according to claim 1, wherein the LC filter is a high pass filter.

3. The multiplexer according to claim 1, wherein the LC filter is a low pass filter.

4. The multiplexer according to claim 1, wherein the LC filter is a notch filter.

5. The multiplexer according to claim 1, wherein a pass band of the first filter is wider than a pass band of the second filter.

6. The multiplexer according to any claim 1, wherein a fractional bandwidth of the first filter is equal to or greater than 4.25%.

7. The multiplexer according to claim 1, further comprising:
a board on which the first filter and the second filter are mounted; and
a resin layer that encapsulates the first filter and the second filter on the board.

8. The multiplexer according to claim 1, wherein the first filter is a receive filter or a filter configured for time division duplexing (TDD).

9. The multiplexer according to claim 1, wherein the second filter is a transmit filter or a filter configured for time division duplexing (TDD).

10. The multiplexer according to claim 1,
wherein the first band is Band 41, and
wherein the LC filter is a notch filter.

11. The multiplexer according to claim 1, wherein the first band is Band 41 or Band 40.

12. The multiplexer according to claim 11, wherein the second band is Band 3.

13. A radio-frequency module comprising:
multiplexer according to claim 1;
a low-noise amplifier connected to the first terminal; and
a power amplifier connected to the second terminal.

14. A communication apparatus comprising:
the radio-frequency module according to claim 13; and
a signal processing circuit configured to process the transmit signals and the receive signals.

* * * * *